(12) United States Patent
Onose

(10) Patent No.: US 9,311,024 B2
(45) Date of Patent: Apr. 12, 2016

(54) OUTPUT SYSTEM, OUTPUT METHOD, AND PROGRAM

(71) Applicant: Hiroshi Onose, Kanagawa (JP)

(72) Inventor: Hiroshi Onose, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/604,912

(22) Filed: Jan. 26, 2015

(65) Prior Publication Data

US 2015/0212761 A1    Jul. 30, 2015

(30) Foreign Application Priority Data

Jan. 29, 2014  (JP) ................... 2014-014097

(51) Int. Cl.
    *G06F 3/12* (2006.01)
(52) U.S. Cl.
    CPC ............ *G06F 3/1204* (2013.01); *G06F 3/1222* (2013.01); *G06F 3/1238* (2013.01); *G06F 3/1239* (2013.01); *G06F 3/1254* (2013.01); *G06F 3/1267* (2013.01); *G06F 3/1288* (2013.01)
(58) Field of Classification Search
    USPC ................ 358/1.15, 468, 448, 1.18, 1.13
    See application file for complete search history.

(56) References Cited

U.S. PATENT DOCUMENTS

| | | | |
|---|---|---|---|
| 7,139,095 B1 * | 11/2006 | Hunter | 358/1.18 |
| 8,714,451 B2 | 5/2014 | Sakagami et al. | |
| 2008/0117447 A1 * | 5/2008 | Okada et al. | 358/1.13 |
| 2009/0002733 A1 * | 1/2009 | Kakigi | 358/1.9 |
| 2011/0096359 A1 * | 4/2011 | Taniuchi | 358/1.15 |
| 2012/0031968 A1 * | 2/2012 | Ohsugi | 235/380 |
| 2012/0069381 A1 * | 3/2012 | Nagai | 358/1.14 |
| 2014/0029035 A1 * | 1/2014 | Maruyama et al. | 358/1.13 |
| 2014/0043624 A1 * | 2/2014 | Wang et al. | 358/1.8 |

FOREIGN PATENT DOCUMENTS

| | | |
|---|---|---|
| JP | 2007-249714 | 9/2007 |
| JP | 2008-244518 | 10/2008 |
| JP | 2014-059768 | 4/2014 |
| JP | 2014-179003 | 9/2014 |

* cited by examiner

*Primary Examiner* — Jerome Grant, II
(74) *Attorney, Agent, or Firm* — IPUSA, PLLC

(57) ABSTRACT

An output system including at least one output apparatus, an information processing apparatus, and a network connecting the at least one output apparatus with the information processing apparatus includes a reading unit that reads identification information stored in a portable recording medium, and an output setup change unit that changes, when the portable recording medium is a portable recording medium for setup, an output setup of the output apparatus to another output setup associated with the identification information of the portable recording medium for setup.

12 Claims, 14 Drawing Sheets

FIG.5

| APPARATUS NAME | APPARATUS IDENTIFICATION CODE | REAL PRINTER |
|---|---|---|
| IMAGE FORMING APPARATUS 5a | A123 | PRINTER 50a |
| IMAGE FORMING APPARATUS 5b | B456 | PRINTER 50b |
| ... | ... | ... |

| APPARATUS IDENTIFICATION CODE | UPPER LIMIT ADMINISTRATION | ON-DEMAND PRINT | ON-DEMAND BILLING |
|---|---|---|---|
| A123 | ON | OFF | OFF |
| B456 | ON | ON | ON |
| ... | ... | ... | ... |

| GROUP NAME | APPARATUS NAME |
|---|---|
| GROUP A | IMAGE FORMING APPARATUS 5a<br>IMAGE FORMING APPARATUS 5b |
| GROUP B | IMAGE FORMING APPARATUS 5c<br>IMAGE FORMING APPARATUS 5d<br>IMAGE FORMING APPARATUS 5e |
| ... | ... |

| CARD INFORMATION | UPPER LIMIT ADMINISTRATION | ON-DEMAND PRINT | ON-DEMAND BILLING | RANGE | 304 |
|---|---|---|---|---|---|
| CARD A | OFF | OFF | OFF | GROUP A | |
| CARD B | ON | ON | OFF | GROUP B | |
| .. | .. | .. | .. | .. | |

FIG.9

| APPARATUS NAME | UPPER LIMIT ADMINISTRATION | ON-DEMAND PRINT | ON-DEMAND BILLING | TIME | CARD INFORMATION |
|---|---|---|---|---|---|
| IMAGE FORMING APPARATUS 5a | ON | OFF | OFF | 2013/11/20/11:30:10 | CARD A |
| IMAGE FORMING APPARATUS 5b | ON | OFF | OFF | 2013/11/20/11:30:10 | CARD A |
| IMAGE FORMING APPARATUS 5c | OFF | OFF | ON | 2013/11/20/12:30:12 | CARD B |
| .. | .. | .. | .. | .. | .. |

FIG.10

| USER INFORMATION | USER OR GROUP | UPPER LIMIT NUMBER OF SHEETS |
|---|---|---|
| USER A | 0 | 100 |
| USER GROUP A | 1 | 500 |
| ⋮ | ⋮ | |

| USER NAME | ACCUMULATED NUMBER OF SHEETS |
|---|---|
| USER A | 60 |
| USER B | 50 |
| USER C | 20 |
| ⋮ | ⋮ |

| CARD INFORMATION | USER NAME | ‥ |
|---|---|---|
| CARD A | USER A | |
| CARD B | USER B | |
| CARD C | USER C | |
| ⋮ | ⋮ | |

308

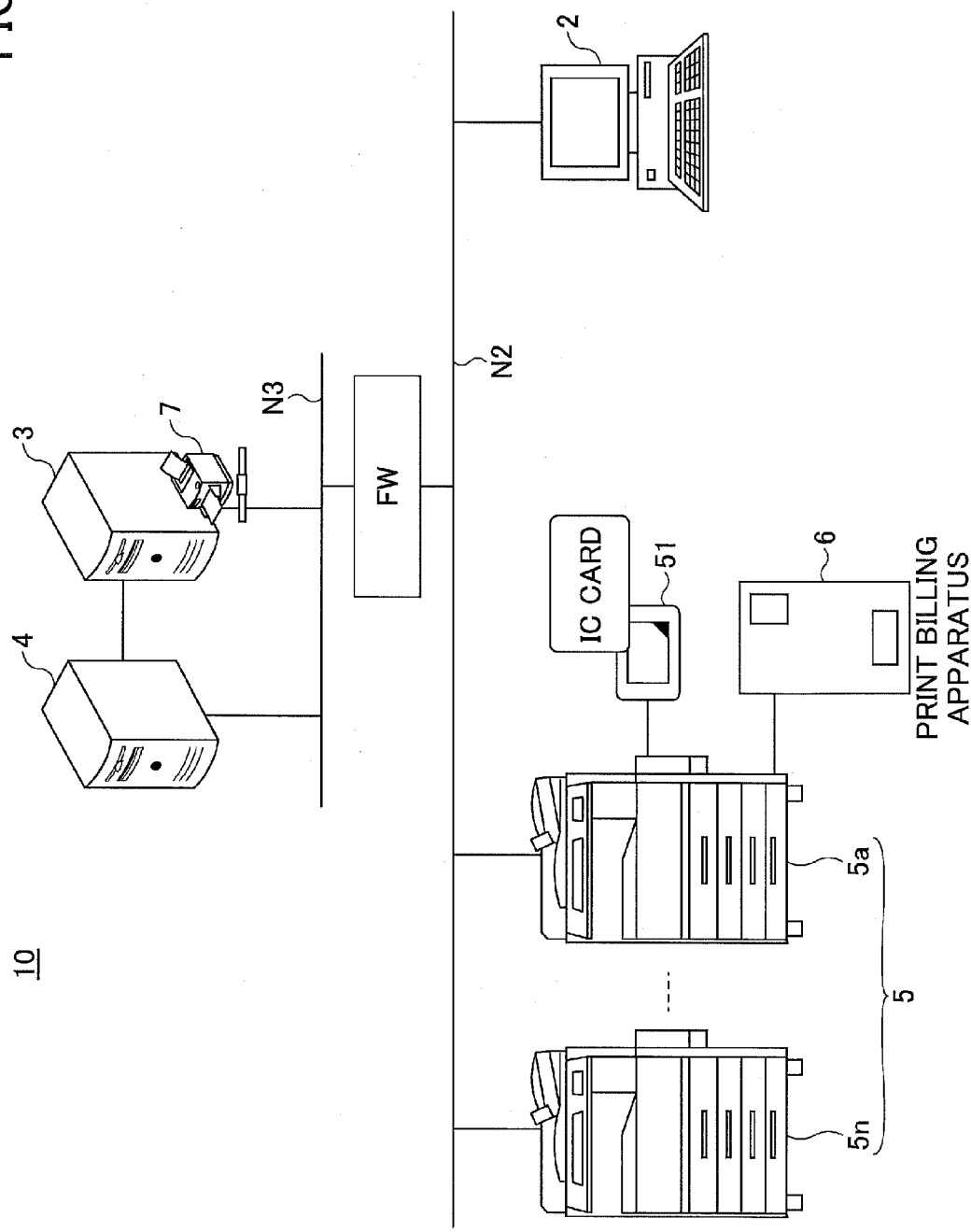

OUTPUT SYSTEM, OUTPUT METHOD, AND PROGRAM

BACKGROUND OF THE INVENTION

1. Field of the Invention

The present invention relates to an output system, an output method, and a program.

2. Description of the Related Art

An exemplary on-demand print is provided to spool (accumulate) a print job received from a client apparatus in a print server or the like without immediately printing the print job and to print the print job selected by a user from a view of the spooled print jobs after the user logs in an image forming apparatus (an output apparatus).

When the user logs into the image forming apparatus, authentication using a input of an user ID and a password or authentication using an IC card such as a student identification card or an employee identification card are performed. In recent years, there is a technique that a print setup of an image forming apparatus is changed using this IC card. At first, an administrator operates an administrator's terminal to cause an IC card of an ordinary user to store multiple print setups. When the ordinary user carries the IC card closer to a card reader of the image forming apparatus, a view of multiple print setups stored in the IC card is displayed and a print setup desired by the ordinary user can be selected and changed from a print setup previously determined as in, for example, Patent Document 1.

Patent Document 1: Japanese Laid-Open Patent Publication No. 2007-249714

SUMMARY OF THE INVENTION

It is a general object of at least one embodiment of the present invention to provide **** that substantially obviates one or more problems caused by the limitations and disadvantages of the related art.

It is an object of at least one embodiment of the present invention to provide an output system that substantially obviates one or more problems caused by the limitations and disadvantages of the related art.

One aspect of the embodiments of the present invention may be to provide an output system including at least one output apparatus, an information processing apparatus, and a network connecting the at least one output apparatus with the information processing apparatus that includes a reading unit that reads identification information stored in a portable recording medium; and an output setup change unit that changes, when the portable recording medium is a portable recording medium for setup, an output setup of the output apparatus to another output setup associated with the identification information of the portable recording medium for setup.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 5 illustrates an exemplary apparatus identification code table.

FIG. 6 illustrates an exemplary image forming apparatus setup table.

FIG. 7 illustrates an exemplary apparatus group table.

FIG. 8 illustrates an exemplary setup table for an IC card for the setup change.

FIG. 9 illustrates an exemplary initial setup information table.

FIG. 10 illustrates an exemplary upper limit value table.

FIG. 11 illustrates an exemplary accumulated number table.

FIG. 12 illustrates an exemplary user table for an IC card for authentication.

FIG. 20 illustrates an exemplary print system of an embodiment.

DETAILED DESCRIPTION OF THE PREFERRED EMBODIMENTS

However, when on-demand print introducing an apparatus billing for output is performed in a university or the like using a mechanism of the exemplary print setup, a user having setup authority such as a teacher cannot change a print setup of an image forming apparatus enabled an ordinary user (a student) to use in use of the IC card by the user having the setup authority.

A description is given below, with reference to the FIG. 1 through FIG. 20 of embodiments of the present invention. Where the same reference symbols are attached to the same parts, repeated description of the parts is omitted.

Reference symbols typically designate as follows:

1: print system;
2: user terminal apparatus (information processing apparatus);
3: print server apparatus (information processing apparatus);
4: authentication server apparatus (information processing apparatus);
5, 5a, 5n: image forming apparatus (output apparatus);
6: print billing apparatus (information processing apparatus);
7: virtual printer;
50, 50a, 50n: real printer;
51: IC card R/W (reading unit);
33: card determination unit;
35: information acquisition unit;

36: print setup change unit (output setup change unit); and
37: print setup recovery unit (setup recovery unit).

Next, an embodiment of an output system, an output method, and a program is described. Within the embodiment, a print system is described as an example of an output system. Hereinafter, outputting means printing, for example. Further, a portable recording medium used for authentication is an IC card, for example.

[First Embodiment]
<System Structure>

Figure 1:
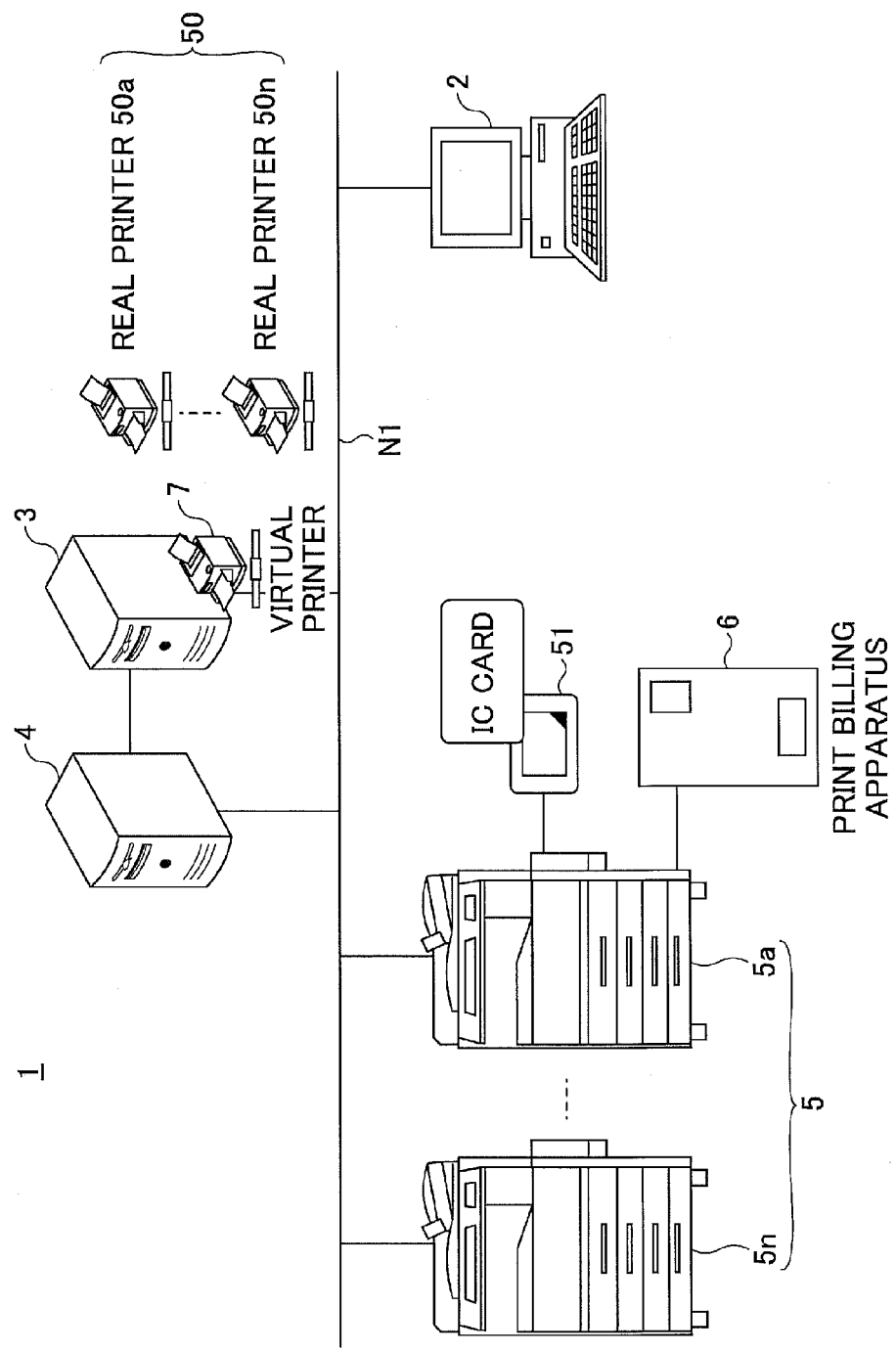
FIG. 1 illustrates an exemplary structure of a print system of an embodiment.

FIG. 1 illustrates an exemplary structure of a print system of a first embodiment of the present invention. The print system 1 includes a network N1 such as a LAN and an information processing apparatus such as a user terminal apparatus 2, a print server apparatus 3, an authentication server apparatus 4, an output apparatus 5 (hereinafter, referred to as an image forming apparatus), and a print billing apparatus 6. Referring to FIG. 1, the number of the user terminal apparatus 2 is one. However, the number may be multiple.

Further, although multiple image forming apparatuses 5a to 5n are exemplified, the number may be one or greater. In the following description, in a case where any one of image forming apparatuses 5a to 5n can be used, the image forming apparatuses 5a to 5n are collectively called the image forming apparatus 5. Further, the number of the print billing apparatus 6 is equal to the number of the image forming apparatuses 5.

The user terminal apparatus 2 is an information processing apparatus used by the ordinary user. For example, the ordinary user is a student or the like in a university or the like. The user terminal apparatus 2 may be a terminal device such as a smartphone, a mobile phone, a PC, or the like. The user terminal apparatus 2 has a function of requesting to print by sending a print job to the print server apparatus 3 using installed application software or the like.

The print server apparatus 3 is an example of the information processing apparatus. The print server apparatus 3 receives an authentication request or a job effectuation from the user terminal apparatus 2 or the like by means of a http communication or the like. A real printer 50 and a virtual printer 7 are included inside the print server apparatus 3. The number of the real printers 50 is equal to the number of the image forming apparatuses 5. The real printers 50a to 50n are associated with the image forming apparatuses 5a to 5n. When the real printer 50a is set, the image forming apparatus 5a performs outputting. The real printer 50 has a function of spooling the print job. The virtual printer 7 has a function of spooling the print job.

In a case where on-demand print is set, the print server apparatus 3 accumulates (spools) the print job received from the user terminal apparatus 2 inside the virtual printer 7. In a case where a direct print of printing from the user terminal apparatus 2 to the image forming apparatus 5 is set, the print server apparatus 3 accumulates (spools) the print job received from the user terminal apparatus 2 inside the real printer 50 (50n) corresponding to the image forming apparatus 5 designated by the user. The received print job and job attribute information associated with the job may be accumulated in an external storage or an external database or an internal storage or an internal database.

Further, a print server apparatus 3 receives a request to authenticate or a request to acquire the job from the image forming apparatus 5. The print server apparatus 3 requests the authentication request from the user terminal apparatus 2 or the image forming apparatus 5 to the authentication server apparatus 4. The print server apparatus 3 may hold an ordinary authentication system inside the print server apparatus 3, and performs authentication using the authentication system.

The application server apparatus 4 is substantialized by at least one information processing apparatus. The authentication server apparatus 4 is an example of an authentication unit. The authentication server apparatus 4 holds user information. The authentication server apparatus 4 has a function of authenticating based on a request from the user terminal apparatus, the print server apparatus 3, the image forming apparatus 5, and the print billing apparatus 6 using a hierarchical structure for authenticating each user.

The IC card (the example of the portable recording medium) used for the user authentication is described. Within the embodiment, two types of the IC card are used. One of the two types of the IC card is an IC card for authentication provided for the ordinary user (the student) and exclusively used for the authentication. Identification information (card information) for identifying the user is stored in the IC card for authentication. The other one of the two types of the IC card is an IC card for a setup change provided for changing the print setup provided for the user having setup authority such as a teacher. Identification information (card information) of a type different from that of the identification information for identifying the ordinary user is stored in the IC card for the setup change. Further, the identification information of the user having the setup authority is a key for calling print setup information associated with the identification information of the user having the setup authority stored inside the print server apparatus 3 as described below. Hereinafter, a portable recording medium for setup includes an IC card for a setup change.

The image forming apparatus 5 is an output apparatus such as a printer, a copier, a multifunction peripheral (MFP), or a laser printer, which is connected to the network N1 using a wired or wireless communication. An IC card reader/writer (hereinafter, a card R/W) 51 is added to the image forming apparatus 5. After the IC card R/W 51 reads the identification information of the IC card, the IC card R/W 51 performs a function of sending the authentication request, the acquisition request to acquire the print job, or the like to the print server apparatus 3. The card R/W 51 is an example of a reading unit for reading the identification information (the card information) stored in the IC card and is associated with the image forming apparatus 5 (the output apparatus). The card R/W 51 may be installed inside the image forming apparatus 5 or connected as an attachment for the image forming apparatus 5.

The print billing apparatus 6 is an example of the information processing apparatus. The print billing apparatus 6 is connected with the image forming apparatus 5 so as to be communicable with the image forming apparatus 5 and has a function of recognizing billing for the user in response to the print request from the image forming apparatus 5 and causing the image forming apparatus to start printing after recognizing the billing. Further, the print billing apparatus 6 includes a display unit for displaying a charge for the print job. Further, the print billing apparatus 6 appropriately includes a reading unit for displaying identifying the user.

Within the embodiment, although the print server apparatus 3 and the authentication server apparatus 4 are described as a single apparatus, the function can be distributed through various kinds of the network. Further, although each user terminal apparatus 2 is illustrated as a desktop personal computer, each user terminal apparatus 2 may be a mobile phone or a mobile computer, which can be connected to the network, as long as each user terminal apparatus 2 fits a usage pattern.

Further, the network N1 illustrated in FIG. 1 may be a wired or wireless dedicated circuit, the Internet, or an intranet. When the dedicated circuit is used as the network N1, the network N1 may be formed by or included in a wide area network (WAN), a metropolitan area network (MAN), a local area network (LAN) depending in the location of the print server apparatus 3. The network N1 requires enforcement of security such as a use of the dedicated circuit, encryption of transmission data, authentication of the user using each client apparatus, or the like.

<Table>

Next, table information held by the memory unit (not illustrated) of the print server apparatus 3 is described.

(Apparatus Identification Code Table 301)

FIG. 5 illustrates an example of an apparatus identification code table 301. The apparatus identification code table 301 includes information related to an apparatus identification code (an example of apparatus identification information) given to the image forming apparatus 5 and information related to the real printer associated with the apparatus identification code. For example, the apparatus identification code of "A123" is given to the image forming apparatus "5a" and is associated with the real printer "50a".

(Image Forming Apparatus Setup Table 302)

FIG. 6 illustrates an exemplary image forming apparatus setup table 302. The image forming apparatus setup table is a setup table related to print conditions set to the image forming apparatus 5. As illustrated in FIG. 6, the print information is set using the apparatus identification codes respectively given to the image forming apparatuses 5. For example, the print setup of the image forming apparatus 5 corresponding to the apparatus identification code of "A123" is as follows: an upper limit administration is "ON"; on-demand print is "OFF", and on-demand billing of "OFF". According to this print setup of the image forming apparatus 5, the direct print is possible without the billing while the upper limit administration of the number of printed sheets is performed.

(Apparatus Group Table 303)

FIG. 7 illustrates an exemplary apparatus group table 303. The apparatus group table 303 relates to group information to which the image forming apparatus 5 belongs. The image forming apparatuses 5 in one class room or one lecture hall, where a lesson is held in a university or the like, are grouped. The image forming apparatuses 5 are not limited to be grouped only in this manner. When the image forming apparatuses 5 in one class room or one lecture hall are grouped, a change of the print setup given to one of the grouped image forming apparatuses 5 can be effectuated (reflected) on all of the grouped image forming apparatuses 5. Referring to FIG. 7, image forming apparatuses 5a and 5b belong to a group A.

(Setup Table 304 of IC Card for the Setup Change)

FIG. 8 illustrates an exemplary setup table 304 for the IC card for a setup change. The setup table 304 for the IC card for the setup change is associated with card information (identification information) of the IC card for the setup change used by a user having setup authority. When the card information of the IC card for the setup change is "card A", the print setup is set as follows: the upper limit administration is "OFF"; the on-demand print is "OFF"; the on-demand billing is "OFF"; and a range of changing the print setup is "group A". The IC card for the setup change corresponding to card information of "card A" obtained by the user having setup authority is carried closer to the IC card R/W 51 of the image forming apparatus 5, the above print setup is effectuated in (reflected on) the image forming apparatuses 5 (the image forming apparatuses 5a and 5b) belonging to the group A using "card A" as the key. When the setup change is completed, the print conditions of the corresponding image forming apparatus 5 illustrated in FIG. 6 is also changed (overwritten).

The range of changing the print setup may not be set. This setup table is provided so as to allocate the IC card for the setup change to one class room or one lecture hall. However, when the IC card for the setup change is allocated to a teacher, the teacher changes the print setup of the image forming apparatus 5 using the own IC card for the setup change that is allocated in every class room to which the teacher moves. In this case, it is preferable to use a table in which the range of changing the print setup is not determined. When the teacher carries the own IC card for the setup change closer to one of multiple image forming apparatuses 5 in the class room at the destination, the card information and the apparatus identification code are sent to the print server apparatus 3. Because the print server apparatus 3 has the apparatus group table 303, it is possible to effectuate (reflect) the print setup of the setup table 304 of the IC card for the setup change for the image forming apparatuses 5 belonging to the group of the image forming apparatus 5 to which the IC card for the setup change is carried closer.

(Initial Setup Information Table (Cache) 305)

FIG. 9 illustrates an exemplary initial setup information table (cache) 305. The initial setup information table (cache) 305 holds the setup table of default setups before the setup change of each image forming apparatus 5, card information specifying the card whose setup has been changed, and a time when the setup has been changed, as cache. The initial setup information table 305 is used to return the changed print setup of the image forming apparatus 5 to the initial state. As described later, in order to return the changed print setup of the image forming apparatus 5 to the initial state, the IC card for the setup change is carried closer to the IC card R/W 51 again. It is possible to automatically return the changed print setup to the initial setup after a predetermined time passes after changing the print setup using the IC card for the setup change. In this case, the initial setup information table 305 further has a time-out table. In the time-out table, a time (an interval) can be set or changed by a system administrator or the like.

(Upper Limit Value Table 306)

FIG. 10 illustrates an exemplary upper limit value table 306. An upper limit number of sheets is an upper limit value of the number of printed sheets set for each ordinary user or each user group. When the upper limit administration is performed, the upper limit value table 306 is referred to. For example, "user A" is set so as not to belong to a user group of "0" (belonging to no group) and to have an upper limit number of sheets of 100. The "user group A" belongs to a user group of "1" and has a upper limit number of sheets of "500".

(Accumulated Number Table 307)

FIG. 11 illustrates an exemplary accumulated number table 307. The accumulated number table 307 registers an accumulated number of printed sheets for each user. When the upper limit administration is performed, the number of printed sheets is continuously added.

(User Table 308 of IC Card for Authentication)

FIG. 12 is an exemplary user table 308 of the IC card for authentication of the ordinary user. The user table 308 is an information table associating the ordinary user with the IC card for the authentication. Referring to FIG. 12, "user name" is used for specifying (authenticating) a user when the printing is performed.

<Hardware Structure>

The user terminal apparatus, the print server apparatus 3, and the authentication server apparatus 4 illustrated in FIG. 1 are substantialized by a computer system of a hardware structure as described below.

This hardware structure is similar to an ordinary personal computer, an ordinary work station, or the like and includes an input device, a display device, an external I/F, a random access memory (RAM), a read only memory (ROM), a central processing unit (CPU), a hard disk drive (HDD), and so on, which are mutually connected by a bus.

The CPU performs execution of various programs and arithmetic processing. The ROM stores a program or the like necessary for starting up the hardware structure. The RAM temporarily stores the process performed by the CPU and stores data. The input device is a keyboard or a mouse. The output apparatus may be a display. The communication device communicates with another device through the network N1. The HDD stores various data and programs. The input device and the display device can be connected and used when necessary.

<Software Structure>

<<Print Server Apparatus 3>>

Figure 2:
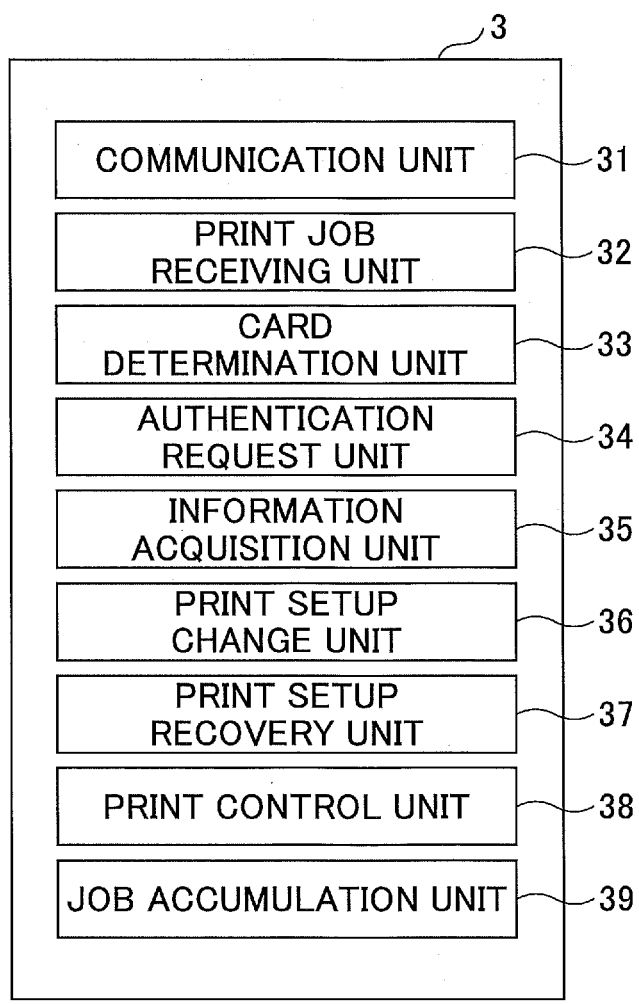
FIG. 2 is an exemplary processing block chart of a print server apparatus of the embodiment.

The print server apparatus 3 of the first embodiment is substantialized by, for example, a processing block illustrated in, for example, FIG. 2.

FIG. 2 is an exemplary processing block chart of a print server apparatus 3 of the first embodiment. The print server apparatus 3 substantializes a communication unit 31, a print job receiving unit 32, a card determination unit 33, an authentication request unit 34, an information acquisition unit 35, a print setup change unit 36 (an example of an output setup change unit), a print setup recovery unit 37 (an example of a setup recovery unit), a print control unit 38, and a job accumulation unit 39 by a CPU, a memory, or the like installed in the print server apparatus 3.

The communication unit 31 communicates with the user terminal apparatus 2, the image forming apparatus 5, and the authentication server apparatus 4 by an http communication or the like. The print job receiving unit 32 receives the print job from the user terminal apparatus 2 through the communication unit 31 and accumulates the received print job in the job accumulation unit 39. The card determination unit 33 determines whether the IC card carried closer to the IC card R/W 51 is the IC card for the authentication or the IC card for the setup change. This determination is done based on card information (identification information) recorded in each IC card and card information of each IC card stored in the print server apparatus 3. The authentication request unit 34 requests the authentication server apparatus 4 or an internal authentication system to authenticate based on card information stored in the IC card of the user and receives the result of the authentication. When the authentication request unit 34 successfully completes the authentication, the authentication request unit 34 sends the user information to the print control unit 38.

The information acquisition unit 35 acquires information (the apparatus identification code table 301) of the image forming apparatus 5 and information (the apparatus group table 303) related to the apparatus group. Further, the information acquisition unit 35 acquires information related to the print setup associated with the identification information of the IC card for the setup change from the setup table of the IC card for the setup change.

The print setup change unit 36 instructs to effectuate (reflect) the print setup associated with the card information of the IC card for the setup change acquired by the information acquisition unit 35 on the print setup of the designated image forming apparatus 5 and the group to which the image forming apparatus 5 belongs.

The print setup recovery unit 37 has a function of returning the print setup of the image forming apparatus 5 changed by the IC card for the setup change to the initial setup. After the IC card R/W of the image forming apparatus 5 reads the same card information of the IC card for the setup change and sends the card information through the communication unit 31, the changed print setup of the image forming apparatus 5 is returned. Alternatively, when a predetermined time passes after changing the print setup by the IC card for the setup change, the changed print setup of the image forming apparatus 5 is returned.

The print control unit 38 acquires the authentication information sent from the authentication request unit 34 and then causes printing to be performed by sending the acquired authentication information to a print instructing unit 64 of the image forming apparatus 5 as described below.

The job accumulation unit 39 accumulates the job sent by the user terminal apparatus 2 received by the print job receiving unit 32, the job attribute information of the job, and so on. The card determination unit 33 may be included in the authentication server apparatus 4.

<<Image Forming Apparatus 5>>

Figure 3:
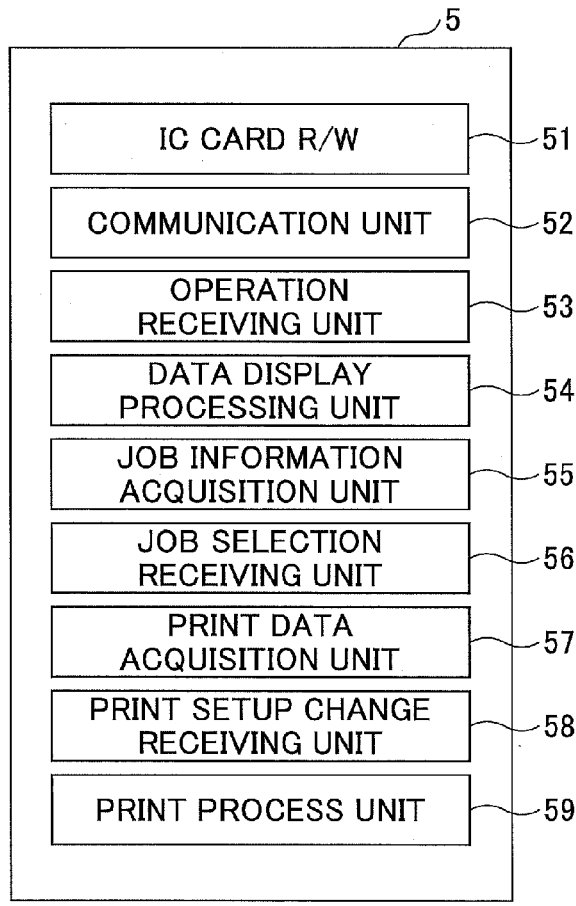
FIG. 3 illustrates an exemplary image forming apparatus of the embodiment.

The image forming apparatus 5 of the first embodiment is substantialized by the processing block illustrated in, for example, FIG. 3.

The image forming apparatus 5 substantializes the IC card R/W 51, a communication unit 42, an operation receiving unit 53, a data display processing unit 54, a job information acquisition unit 55, a job selection receiving unit 56, a print data acquisition unit 57, a print setup change receiving unit 58, and a print process unit 59 by performing a program using a CPU, a memory, or the like installed in the image forming apparatus 5.

The IC card R/W 51 is an example of the reading unit. The IC card R/W 51 has functions of acquiring card information peculiar to the IC card for the authentication owned by the user and card information peculiar to the IC card for the setup change owned by the user having the setup authority and simultaneously sending the card information to the print server apparatus 3 to request to perform the user authentication. Within the first embodiment, the IC card R/W 51 is structured to be added to the image forming apparatus 5 or to be connected to the outside of the image forming apparatus 5 by an appropriate connection method.

The communication unit 52 communicates with the print server apparatus 3 by the http communication or the like. The operation receiving unit 53 receives an operation from the ordinary user. The data display processing unit 54 performs a display of the print job or the like to the ordinary user. The job information acquisition unit 55 acquires view information of the print job of the authorized ordinary user from the print server apparatus 3. The job selection receiving unit 56 receives a selection of the print job from a print job view screen. The print data acquisition unit 57 acquires print data of the print job selected by the user from the print server apparatus 3. The print setup change receiving unit 58 has a function of changing the print setup to a new print setup by receiving a print setup change request from the print setup change unit 36 of the print server apparatus 3. The print setup change receiving unit 58 has a function of changing (recovering) the print setup to the initial print setup after receiving a request to recovering the initial print setup from the print setup recovery unit 37 of the print server apparatus 3. The print process unit 59 performs a print process of printing the acquired print data in conformity with the print setup.

<<Print Billing Apparatus 6>>

Figure 4:
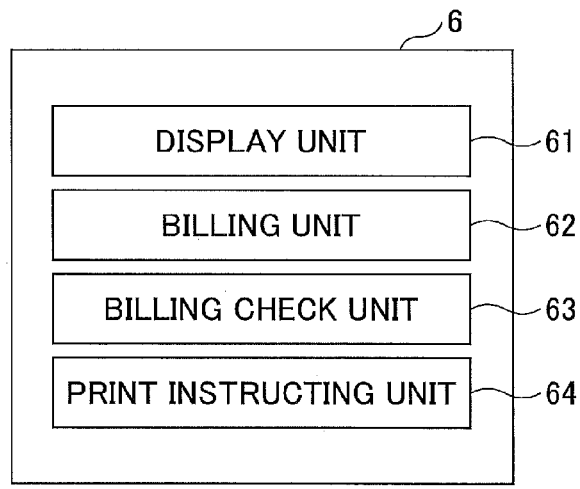
FIG. 4 is an exemplary processing block chart of a print billing apparatus of the embodiment.

FIG. 4 is an exemplary processing block chart of the print billing apparatus 6 of the first embodiment. The print billing apparatus 6 substantializes a display unit 61, a billing unit 62, a billing check unit 63, and a print instructing unit 64 by executing a program using a CPU, a memory, or the like installed in the print billing apparatus 6.

For example, the print billing apparatus 6 uses a coin rack system that enables to pay by a coin or a paper note or a reading device that enables to pay by a prepaid card or an IC card. Further, the print billing apparatus 6 can have a form of a printing operation terminal by further providing various input units such as a touch panel, a mouse, or a keyboard.

The display unit 61 displays a charge for the print job to the user. When the print setup is no billing, the charge is not displayed.

The billing unit 62 has a function of receiving a payment from the user. The function of receiving the payment can be substantialized by the coin rack system or the reading device described above.

The billing check unit 63 checks whether the user has paid the charge in the billing unit 62, sends payment completion information to the print instructing unit 64 and the print data acquisition unit 57.

<Detailed Process>

Hereinafter, a detailed process performed by the print system 1 is described. Referring to FIGS. 13 to 16, a print setup change process and a print process are separately described. A case where the print setup does not have an on-demand billing setup (a case of the upper limit administration) is illustrated in FIGS. 13 to 16.

<<Print Setup Change Process (Upper Limit)>>

Figure 13:
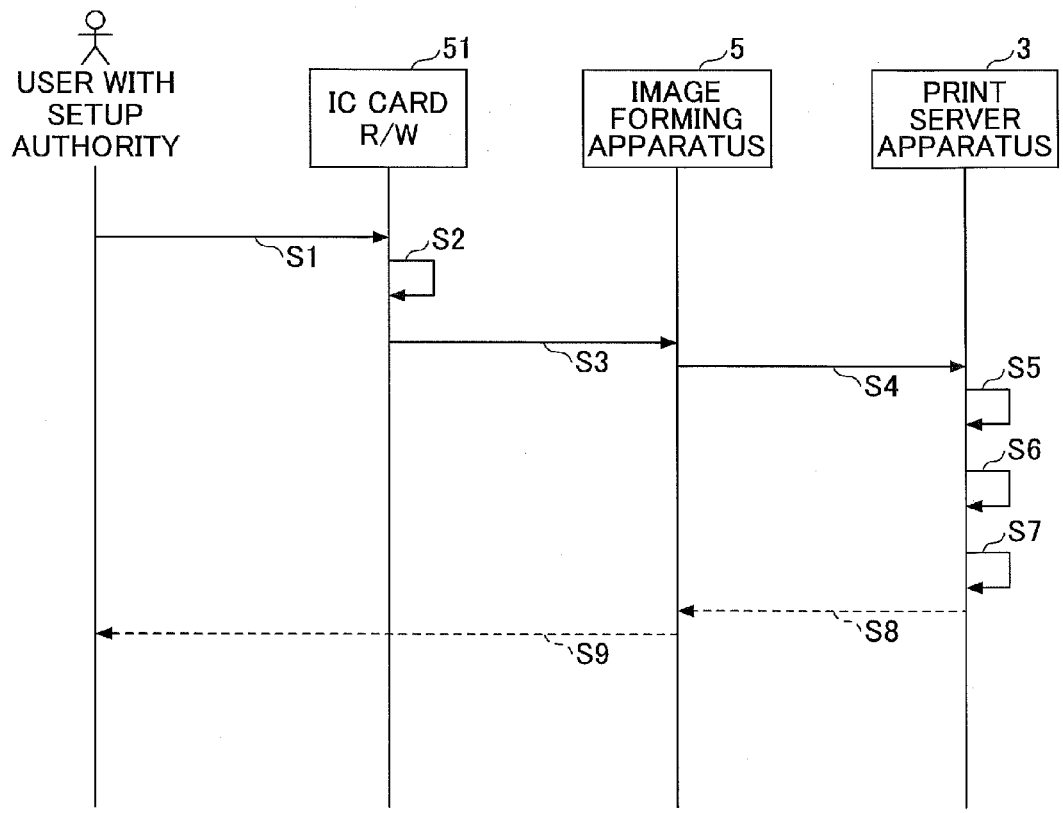
FIG. 13 is a sequence chart illustrating an exemplary print setup change process in the print system of the embodiment.

At first, the print setup change process for the image forming apparatus 5 in the print system of the first embodiment is described. FIG. 13 is a sequence chart of illustrating a sequence of causing the print server apparatus 3 to change the print setup of the image forming apparatus 5 by the user having the setup authority.

When the user having the setup authority carries the IC card for the setup change closer to the IC card R/W 51 of the image forming apparatus 5 (step S1), the IC card R/W 51 reads card information for identifying the user (step S2) and sends the read card information to the communication unit 52 of the image forming apparatus (step S3). The communication unit 52 of the image forming apparatus 5 sends the received card information and an own apparatus identification code to the print server apparatus 3 (step S4). The print server apparatus 3 checks validity whether the acquired card information is registered (step S5). In step S5, the print server apparatus 3 checks the validity by requesting the authentication server apparatus 4 to authenticate. At this time, the print server apparatus 3 determines whether the IC card carried closer to the IC card R/W 51 is the IC card for the authentication or the IC card for the setup change by the card determination unit 33. Hereinafter, the description is given on the premise that the determined IC card is the IC card for the setup change.

When the print server apparatus 3 checks the validity of the IC card for the setup change, the print server apparatus 3 causes the information acquisition unit 35 to acquire print setup information associated with the above described card information associated with the card information from a setup table 304 of the IC card for the setup change (step S6). Then, the acquired print setup is newly set as the print setup of all image forming apparatuses 5 which are targets (step S7). Thus, the print setups are changes (step S8). The image forming apparatus 5 displays the changed print setup on the display unit and reports the setup change to the user having the setup authority (step S9).

Figure 14:
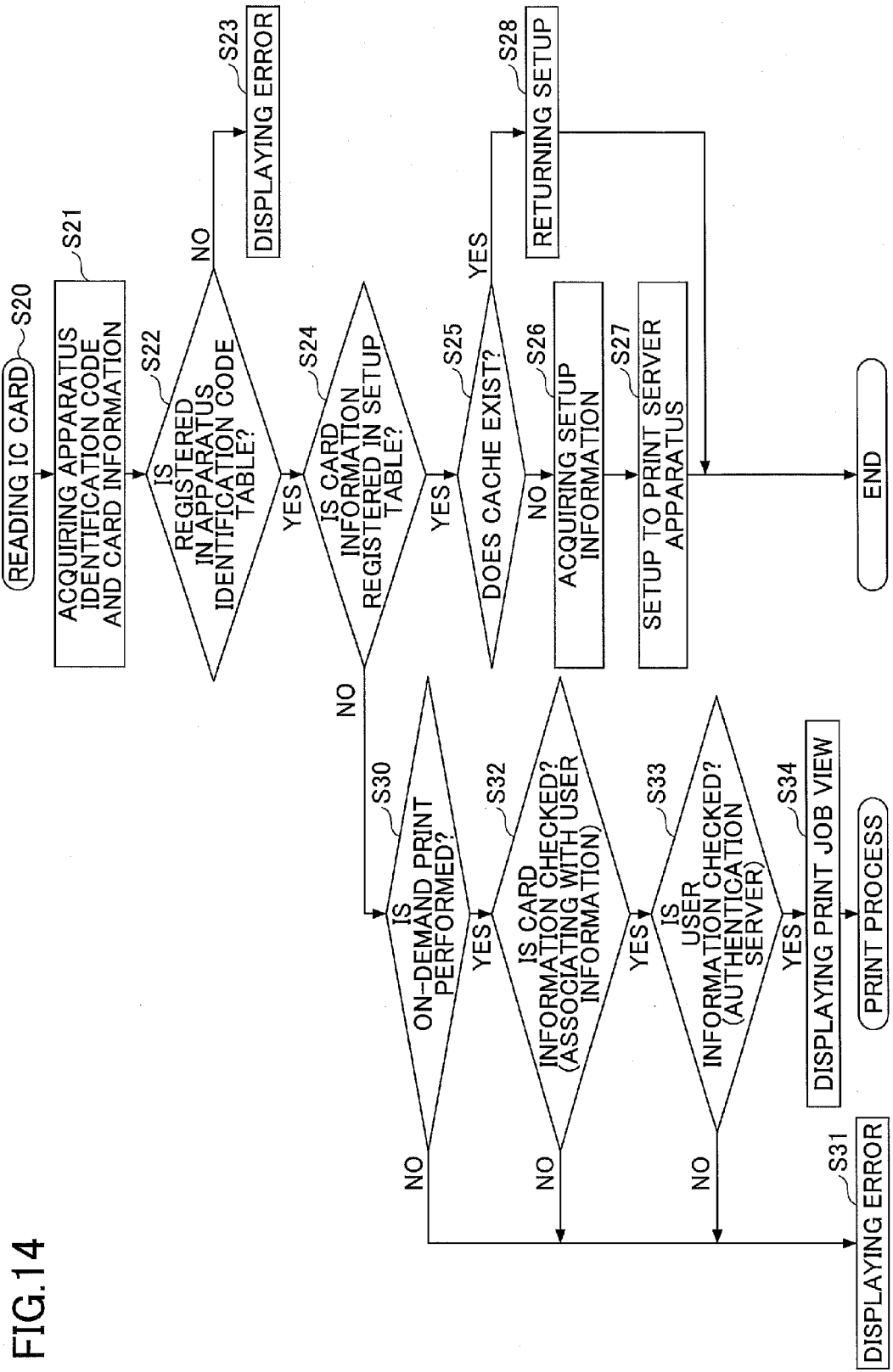
FIG. 14 is a flow chart illustrating an exemplary print setup change process in the print system of the embodiment.

FIG. 14 is a flowchart illustrating an exemplary print setup change process for the image forming apparatus 5 in the print system of the first embodiment.

When the user (the teacher) having the setup authority carries the IC card for the setup change closer to the IC card R/W 51 of the image forming apparatus 5, the IC card R/W 51 reads the card information of the IC card for the setup change (step S20). The image forming apparatus 5 sends the own apparatus identification code and the read card information of the IC card to the print server apparatus 3 and causes the print server apparatus 3 to acquire the own apparatus identification code and the read card information of the IC card (step S21).

The print server apparatus 3 checks whether the acquired apparatus identification code is registered in the apparatus identification code table 301 (step S22). In a case where the apparatus identification code acquired in step S22 is not registered in the apparatus identification code table 301, an error display is indicated (step S23). In a case where the apparatus identification code acquired in step S22 is registered in the apparatus identification code table 301 (YES), the print server apparatus 3 determines whether the acquired card information is registered in the setup table 304 of the IC card for the setup change (step S24). Step S24 is a determination process of determining whether the IC card carried closer to the IC card R/W is the IC card for the setup change. Hereinafter, described first is a case where the IC card carried closer to the IC card R/W is determined to be the IC card for the setup change.

(Case of IC Card for the Setup Change)

In YES of step S24, in a case where the acquired card information is registered (the IC card for the setup change), it is checked whether cache of the acquired card information exists on a column of the apparatus name corresponding to the acquired apparatus identification code in the initial setup information table (cache) 305 (step S25). In a case where the initial setup information table (the cache) 305 does not have a setup change time of the corresponding image forming apparatus 5 and the cache of the acquired card information (NO of step S25), the print setup has not been changed. In a case where the initial setup information table (the cache) 305 has a setup change time of the corresponding image forming apparatus 5 and the cache of the acquired card information (YES of step S25), the print setup is being changed. Said differently, the cache is checked to determine whether the print setup for the image forming apparatus 5 which has sent the card information of the IC card for the setup change to the print server apparatus 3 has already been changed by the same IC card for the setup change.

In step S25, in a case where the initial setup information table 305 has no cache of the acquired card information (NO), the print server apparatus 3 acquires the print setup associated with the card information of the setup table 304 of the IC card for the setup change (step S26).

The print server apparatus 3 newly sets the print setup associated with the acquired card information as the print setup for the image forming apparatus 5 and registers the card information and the time when the setup is performed in the initial setup information table 305 for the image forming apparatus 5 whose print setup is performed (step S27). Referring to FIG. 9, in a case where the card information is "card A", the print setup is as follows: the upper limit administration is "ON"; the on-demand print is "OFF"; and the on-demand billing is "OFF". According to this print setup of the image forming apparatus 5, the direct print is possible without the billing while the upper limit administration of the number of printed sheets is performed.

In step S27, in a case where a range (the group information) of changing the print setup is set to the setup table 304 of the IC card for the setup change is set, the print setup is changed to all of the image forming apparatuses 5 set (designated) within the range, and all of the image forming apparatuses 5 whose print setups are changed are registered in the initial setup information table 305. Therefore, even though multiple image forming apparatuses whose setup changes are required exist in one classroom, the teacher can change the print setups of the multiple image forming apparatuses 5 by carrying the IC card for the setup change closer to the IC card R/W 51 of one of the image forming apparatuses 5 after administrating the multiple image forming apparatuses 5 so as to belong to the same group.

In a case where the cache of the acquired card information already exists on the table for the apparatus name corresponding to the apparatus identification code (YES of step S25), the print server apparatus 3 returns the print setup to the initial print setup in the initial setup information table held in the print setup recovery unit 37 (step S28). Then, the changed print setup before returning to the initial setup and corresponding cache information such as the time and the card information are deleted from the initial setup information table 305. At this time, the user having the setup authority owning the IC card for the setup change having card information "card A" first carries the IC card for the setup change closer to the IC card R/W 51 so as to change the print setup of the image forming apparatus 5. Said differently, steps S20 to S27 are performed. Thereafter, the user having setup authority carries the IC card for the setup change having the card information "card A" closer to the IC card R/W 51 of the image forming apparatus 5. Then, because the print setup recovery unit 37 changes (recovers) the print setup to the initial print setup, for example, when a lesson has been finished, if the teacher (the user having setup authority) carries the IC card for the setup change closer to the IC card R/W 51 again, the print setups of all of the image forming apparatuses 5 can be returned to the initial print setups.

In NO of step S25, although the cache of the acquired card information does not exist, there is a case where a cache of other card information exists. In this case, a previous user having setup authority had not carried the IC card closer to the IC card R/W 51 at the second time to recover the print setup. Therefore, the image forming apparatus 5 is set to have the print setup changed by the previous user having the setup authority.

At this time, the print server apparatus 3 performs a process of giving priority to the latter of deleting the cache such as the card information of the previous IC card for the setup change and the corresponding time and acquiring a print setup associated with the new card information from the setup table 304 of the IC card for the setup change (step S26). The subsequent steps of the process are as described above. The print setup associated with the new card information is set to the print server apparatus 3 and the acquired card information is registered in the cache (step S27). When the print server apparatus 3 has a time-out table, the print setup recovery unit 37 may automatically recover the initial print setup after a passage of a predetermined period of time, e.g., 90 seconds, after the print setup has been changed and deletes the cache corresponding to the image forming apparatus whose print setup is returned. However, in a case where a function of recovering the initial print setup using the time-out table is not provided, it is unnecessary to register the time in the initial setup information table.

Further, when the image forming apparatus 5 subject to the print setup using IC card for the setup change is specified, processes in which the image forming apparatus 5 sends the apparatus identification code and the registration of the apparatus identification code table 301 is checked in the print server apparatus 3 can be omitted. For example, the processes can be omitted in a case where only one image forming apparatus 5 is provided with the print setup, in a case where only a specific image forming apparatus 5 is provided with the print setup, or in a case where all of the image forming apparatuses 5 are provided with the print setup.

(Case of IC Card for Authentication)

Next, in NO of step S24, described is a process immediately before a print process using on-demand print for authentication in a case where the card information acquired in step S21 is not registered in the setup table 304 of the IC card for the setup change.

The case where the card information acquired in step S21 is not registered in the setup table 304 of the IC card for the setup change means a possibility that the IC card carried closer to the IC card R/W 51 is the IC card for the authentication owned by the ordinary user (a student).

Therefore, the print server apparatus 3 first checks whether the print setup of the corresponding image forming apparatus 5 is on-demand print with reference to the image forming apparatus setup table 302 using the apparatus identification code acquired in step S21 as a key (step S30).

The on-demand print for authentication is not set in NO of step S30 (the direct print), the print server apparatus 3 causes the image forming apparatus 5 to indicate an error display (step S31). In the on-demand print, the print server apparatus 3 accumulates the print job sent from the user terminal apparatus 2 to the print server apparatus 3, the user performs the user authentication using the image forming apparatus 5, and the printer acquires the print job accumulated in the print server apparatus 3 after the user authentication is successfully completed. Therefore, when the on-demand print is not set (not permitted), the user performs the user authentication in the image forming apparatus using the IC card for the authentication. If the user authentication is successfully completed, because the print job itself using the in-demand printing is not permitted, the error display is indicated.

In a case where the on-demand print is set in YES of step S30, the acquired card information is checked using the user table 308 of the IC card for the authentication (step S32). Step S32 is provided to check by the print server apparatus 3 whether the card information is associated with the user information with reference to the user table 308 of the IC card for the authentication illustrated in FIG. 12. In a case where the acquired card information is not associated with the user table 308 of the IC card for the authentication in NO of step S32, the print server apparatus 3 causes the image forming apparatus 5 to indicate the error display (step S31).

In a case where the acquired card information is registered in the user table 308 of the IC card for the authentication in YES of step S32, the print server apparatus 3 requests the authentication server apparatus to authenticate based on the user name associated with the card information (step S33).

Figure 16:
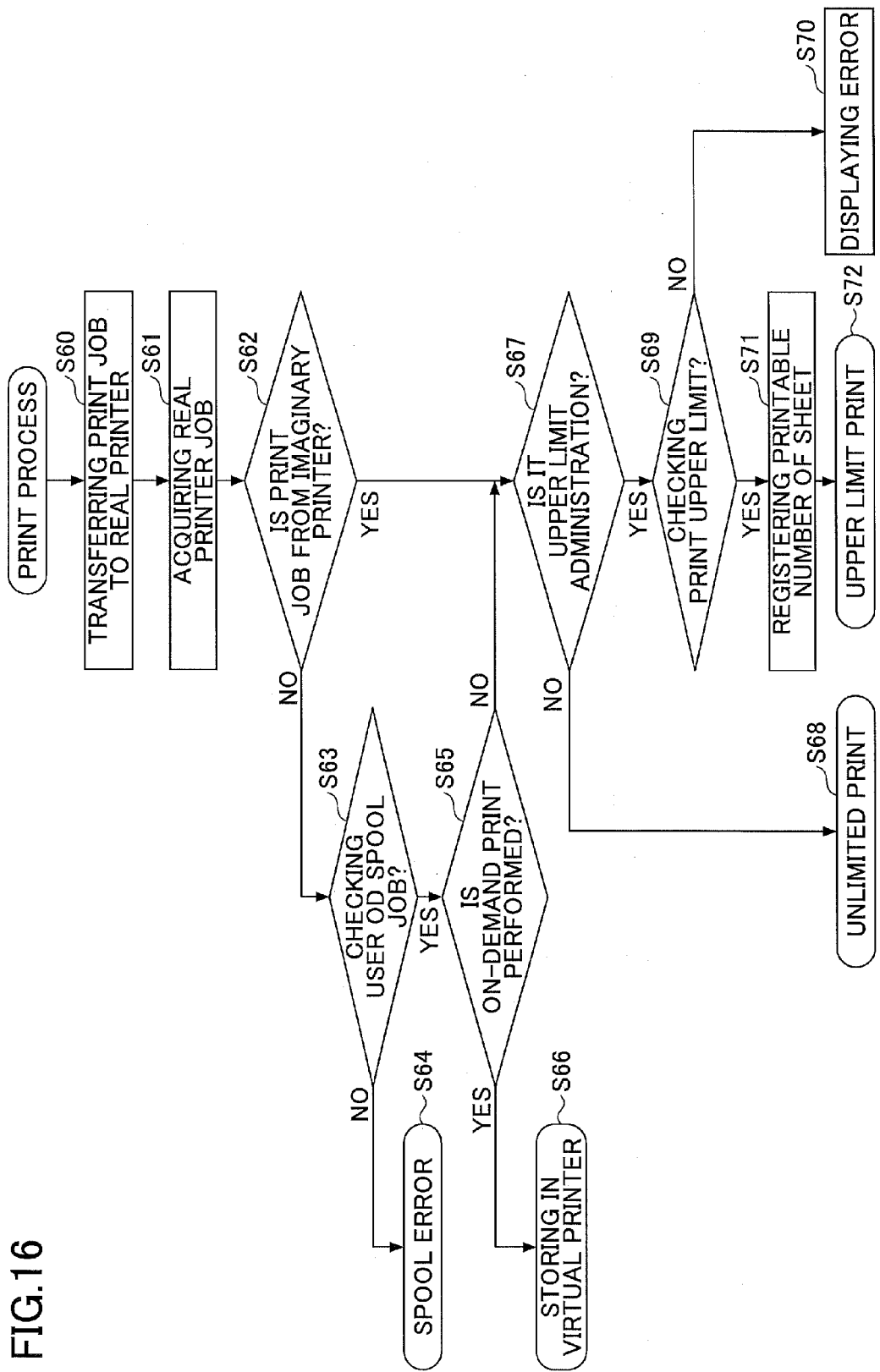
FIG. 16 is a flow chart illustrating an exemplary print process in the print system of the embodiment.

In a case where a report that the authentication is successfully completed is received by the print server apparatus 3 from the authentication server apparatus 4 in YES of step S33, the print server apparatus 3 extracts the print job associated with the authenticated card information from the print jobs spooled (accumulated) in the virtual printer 7 and sends a view of the extracted print jobs to the image forming apparatus 5. Then, the print server apparatus 3 causes the view of the print jobs to display on the data display processing unit 54 of the image forming apparatus 5 and enables the ordinary user to select the print job in step S34. Then, the print server apparatus 3 performs a print process as illustrated in FIG. 16. In a case where a report that the authentication is failed is received by the print server apparatus 3 from the authentication server apparatus 4 in NO of step S33, the print server apparatus 3 causes the image forming apparatus 5 to indicate the error display (step S31).

As described above, the print system 1 of the first embodiment is structured to change the print setup of the image forming apparatus 5 based on the print setup information associated with the card information of the IC card for the setup change when the IC card for the setup change used by the user having the setup authority is authenticated. Therefore, when the user having the setup authority such as the teacher in the university or the like wishes to change the print setup such as the unlimited print, the print without the billing or the direct print only during a lesson or a lecture, it is possible to quite easily change to a predetermined print setup by carrying the IC card for the setup change closer to the IC card for the setup change.

The print server apparatus 3 includes group information of the image forming apparatus 5, whose print setup is changed. Therefore, even though multiple image forming apparatuses 5 whose setup changes are required exist in one classroom, the teacher (the user having setup authority) can change the print setups of all of the multiple image forming apparatuses 5 belonging to the same group by carrying the IC card for the setup change closer to the IC card R/W 51 of one of the image forming apparatuses 5.

Further, because the print system 1 has a measure of returning the print setup changed by the IC card for the setup change to the initial setup, the image forming apparatus 5 can use an ordinary print setup of the image forming apparatus 5 after the lesson is completed to perform general-purpose properties. Further, after a predetermined time passes from the change of the print setup done by the IC card for the setup change, the system causes the changed print setup to be returned to the initial setup or performs the process of giving priority to the latter. Therefore, an appropriate print setup can be always administrated and an unpredictable situation such as massive print without billing can be avoided.

<<Print Process (Upper Limit)>>

Figure 15:
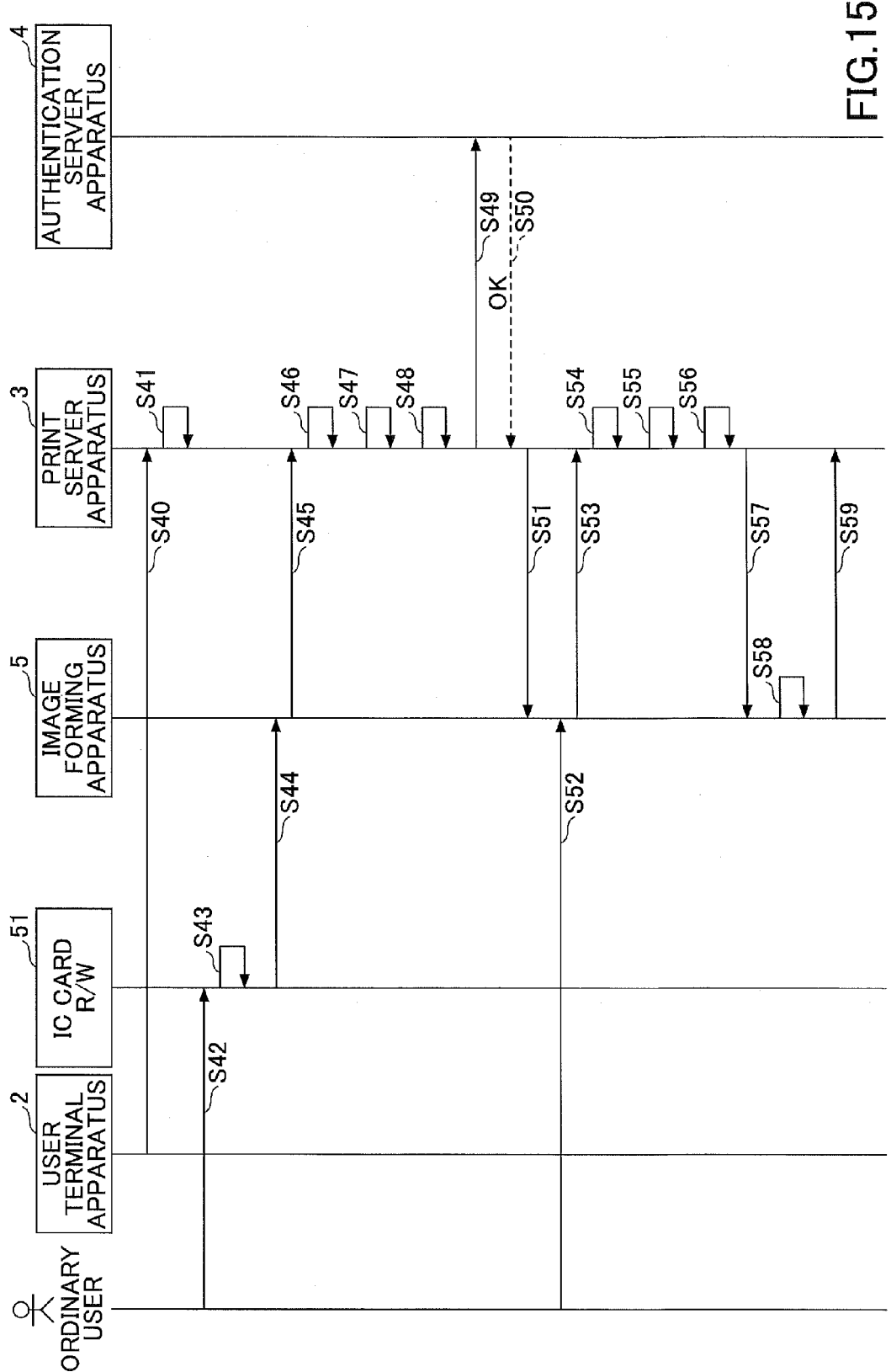
FIG. 15 is a sequence chart illustrating an exemplary on-demand print process (an upper limit) in the print system of the embodiment.

Next, a print process of the print system of the first embodiment is described. FIG. 15 is a sequence chart of the on-demand print process that is performed by the ordinary user using the image forming apparatus 5.

The ordinary user operates to perform a print job by the user terminal apparatus 2 (step S40). Then, in the print server apparatus 3, the print job receiving unit 32 causes the print job to be spooled (stored) in the virtual printer 7 (step S41). The ordinary user carries the own IC card for authentication closer to the I/C card R/W 51 provided to the image forming apparatus 5 (step S42). Then, the IC card R/W 51 reads the card information (step S43) and sends the read card information to the communication unit 52 of the image forming apparatus 5 (step S44).

The image forming apparatus 5 sends the received card information and the own apparatus identification code to the print server apparatus 3 through the communication unit 52 of (step S45). The print server apparatus 3 checks whether the acquired apparatus identification code is registered (step S46). The print server apparatus 3 checks whether the acquired card information is registered in the user table 308 of the IC card for the authentication (step S47). In step S47, the print server apparatus 3 determines that the IC card information corresponds to the IC card for the authentication by the card determination unit 33. Further, the print server apparatus 3 checks the print setup of the corresponding image forming apparatus 5 using the apparatus identification code as a key from the image forming apparatus setup table 302 (step S48). At this time, the print server apparatus 3 checks that the on-demand print is performed. In a case where the direct print is performed, the error display is indicated.

After the checks in steps S46 to S48 are completed, the authentication request unit 34 of the print server apparatus 3 requests the authentication server apparatus 4 to authenticate based on the user name associated with the card information (step S49). If the authentication server apparatus 4 determines that the authentication is possible, the successful authentication is sent to the print server apparatus (step S50).

After receiving the successful authentication, the print server apparatus 3 extracts the print job associated with the authenticated user from the job accumulation unit 39 (specifically, the virtual printer 7) and causes a view of the print jobs to be acquired and displayed by the job information acquisition unit 55 of the image forming apparatus 5 (step S51).

The ordinary user selects a desired print job from the displayed view of the print jobs (step S52). Then, the job selection receiving unit 56 of the image forming apparatus 5 requests the selected print job to the print server apparatus 3 (step S53).

The print server apparatus 3 transfers the requested print job from the virtual printer 7 to the real printer 50 associated with the image forming apparatus 5, to which the IC card is carried by the ordinary user closer (step S54). The print server apparatus 3 checks the upper limit number of sheets of the authenticated user (step S55). In step S55, the upper limit value set to the authenticated user is checked on the upper limit value table 306 illustrated in FIG. 10. Next, the print server apparatus 3 calculates the remaining number of sheets allowed to be printed by the user based on the checked upper limit number of sheets for the user and an accumulated number of sheets checked on the accumulated number table 307 illustrated in FIG. 11 and registers in the print job.

Thereafter, the print control unit 38 of the print server apparatus 3 sends an instruction of performing the print job requested by the user to the image forming apparatus 5 (step S57). The image forming apparatus 5 receiving the print instruction performs the above-described print job by a printable number of sheets (step S58). After the printing is completed, the image forming apparatus 5 sends a print log to the print server apparatus 3 and causes the print server apparatus 3 to accumulate the print log. The print server apparatus 3 updates the accumulated number of sheets for the user in the accumulated number table 307 in response of the number of the printed sheets performed based on the print log (step S59).

FIG. 16 is a flow chart illustrating an exemplary print process in the print system 1 of the first embodiment. The print process includes the on-demand print and the direct print, both of which are described below. In a case of the on-demand print, the user authentication is performed using the IC card for authentication described in steps S32 to S34 of FIG. 14 as a preprocess of the print process. After step S34, various steps illustrated in FIG. 16 are processed.

When the print server apparatus 3 receives an instruction to print from the image forming apparatus 5 or the user terminal apparatus 2, the print server apparatus 3 transfers the print job from the virtual printer 7 to the real printer 50. The print job is spooled to the virtual printer 7 in a case where the print setup is set to the on-demand print. In this case, the print server apparatus 3 transfers the print job to the real printer 50 associated with the image forming apparatus 5, to which the IC card for the authentication is carried closer by the ordinary user. In a case where the print setup is set to the direct print, the print job is directly accumulated from the user terminal apparatus 2 to the real printer 50, which is associated with the image forming apparatus 5 designated by the ordinary user. Therefore, this step S60 is skipped.

When the real printer 50 acquires the print job (step S61), the print server apparatus 3 checks whether the acquired print job is from the virtual printer 7 (step S62). In this step S62, it is checked whether the print setup is the on-demand print or the direct print. As described above, in a case where the print job is through the virtual printer 7, the print setup is the on-demand print. On the other hand, in a case where the print job is not through the virtual printer 7, the print setup is the direct print.

In a case where the print job is not through the virtual printer 7 (the direct print) in NO of step S62, the print server apparatus 3 performs a user check of the spooled print job (step S63). Said differently, it is checked (authenticated) whether the user who instructs the direct print is a legitimate user with the user information added to the print job. If the user is not the legitimate user in NO of step S64, a spool error occurs (step S64). If the user is the legitimate user in YES of step S64, the print server apparatus 3 checks whether the print setup is set to the on-demand print with the setup table 304 of, for example, the IC card for the setup change (step S65).

In a case where the print setup is set to the on-demand print in YES of step S66, the print job is accumulated (spooled) to the virtual printer 7 (step S66). Then, a print instruction from the image forming apparatus 5 is awaited.

In a case where the print setup is not set to the on-demand print in NO of step S65 (the direct print), the process goes to step S67.

The step on or after step S67 is an upper limit administration process flow in the on-demand print and the direct print.

In step S67, it is checked whether a current print setup set to the image forming apparatus 5 is provided with an upper limit administration (ON). If the current print setup is not provided with the upper limit administration (OFF) in NO of step S67, the image forming apparatus 5 is caused to perform unlimited print. In the unlimited print, there is no limitation to the number of printed sheets (step S68).

If the current print setup is provided with the upper limit administration in YES of step S67, the print server apparatus 3 checks the print upper limit of the authenticated user (step S69). In step S69, the upper limit value set to the authorized user is checked on the upper limit value table 306, the accumulated number of sheets for the user is checked on the accumulated number table 307, and the printable number of sheet for the user is calculated. Therefore, in a case where the printable number of sheets is set to be "0" in NO of step S69, the print server apparatus 3 causes the error display to be indicated in step S70. In a case where the printable number of sheets does not reach the upper limit in YES of step S69, the print server apparatus 3 sets the printable number of sheets in the print job in step S71. Thereafter, the print server apparatus 3 causes the image forming apparatus 5 to perform an upper limit print enabling to print within a range of the printable number of sheets in step S72.

<<Print Setup Change Process (Billing)>>

Next, described is a print setup change process for the image forming apparatus 5 of the print system 1 in a case where on-demand billing is set.

Figure 17:
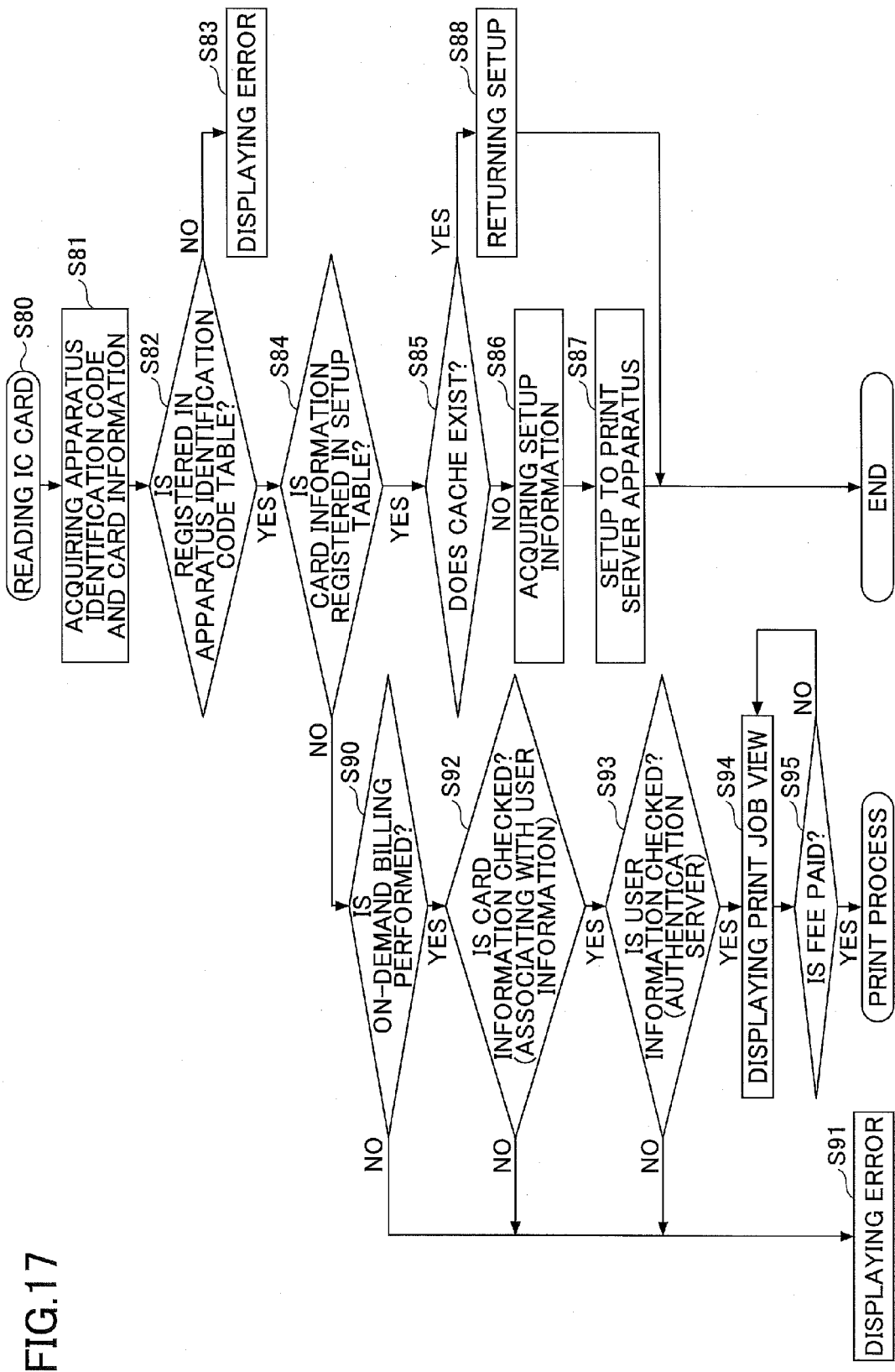
FIG. 17 is a flow chart illustrating an exemplary print setup change process (billing) in the print system of the embodiment.

FIG. 17 is a flowchart illustrating an exemplary print setup change process in the print system 1 to which on-demand billing is set. Steps S80 to S88 of changing the print process illustrated in FIG. 17 are similar to steps S20 to S28 illustrated in FIG. 14. Therefore, description of steps S80 to S88 is omitted. Steps S84 to S88 illustrated in FIG. 17 are similar to steps S24 to S28 illustrated in FIG. 14. Therefore, description of steps S84 to S88 is omitted. FIG. 17 differs from FIG. 14 at steps S90 to S95 used in a case where the print setup is set for the on-demand billing.

Hereinafter, described is only a process immediately before the print process using the on-demand billing in a case where the card information is not registered in the setup table for the IC card for the setup change in NO of step S84.

The case where the card information acquired is not registered in the setup table 304 of the IC card for the setup change means a possibility that the IC card carried closer to the IC card R/W 51 is the IC card for the authentication owned by the ordinary user (a student).

Therefore, the print server apparatus 3 checks whether the print setup of the corresponding image forming apparatus 5 is the on-demand billing with reference to the image forming apparatus setup table 302 using the apparatus identification code acquired in step S81 as a key (step S90). Step S92 is provided to check by the print server apparatus 3 whether the card information is associated with the user information with reference to the user table 308 of the IC card for the authentication illustrated in FIG. 12. In a case where the acquired card information is not associated with the user table 308 of the IC card for the authentication in NO of step S92, the print server apparatus 3 causes the image forming apparatus 5 to indicate the error display (step S91).

In a case where the acquired card information is registered in the user table 308 of the IC card for the authentication in YES of step S92, the authentication request unit 34 of the print server apparatus 3 requests the authentication server apparatus 4 to authenticate based on the user name associated with the card information (step S93).

In a case where a report that the authentication is successfully completed is received by the print server apparatus 3 from the authentication server apparatus 4 in YES of step S93, the print server apparatus 3 extracts the print job associated with the authenticated card information from the print jobs spooled (accumulated) in the virtual printer 7 and sends a view of the extracted print jobs to the image forming apparatus 5. Then, the image forming apparatus 5 causes the data display processing unit 54 to display the view of the print jobs (step S94). When the print server apparatus 3 receives a selection of the print job from the ordinary user, the print server apparatus 3 checks a charge for the selected print job on a charge table (not illustrated), causes the charge to be displayed on the display unit of the print billing apparatus 6, and checks whether the charge is paid to the print billing apparatus 6 (step S95).

In a case where the charge is not paid to the print billing apparatus 6 in NO of step S95, a payment of the charge is awaited while the view of the print jobs are being displayed.

Figure 19:
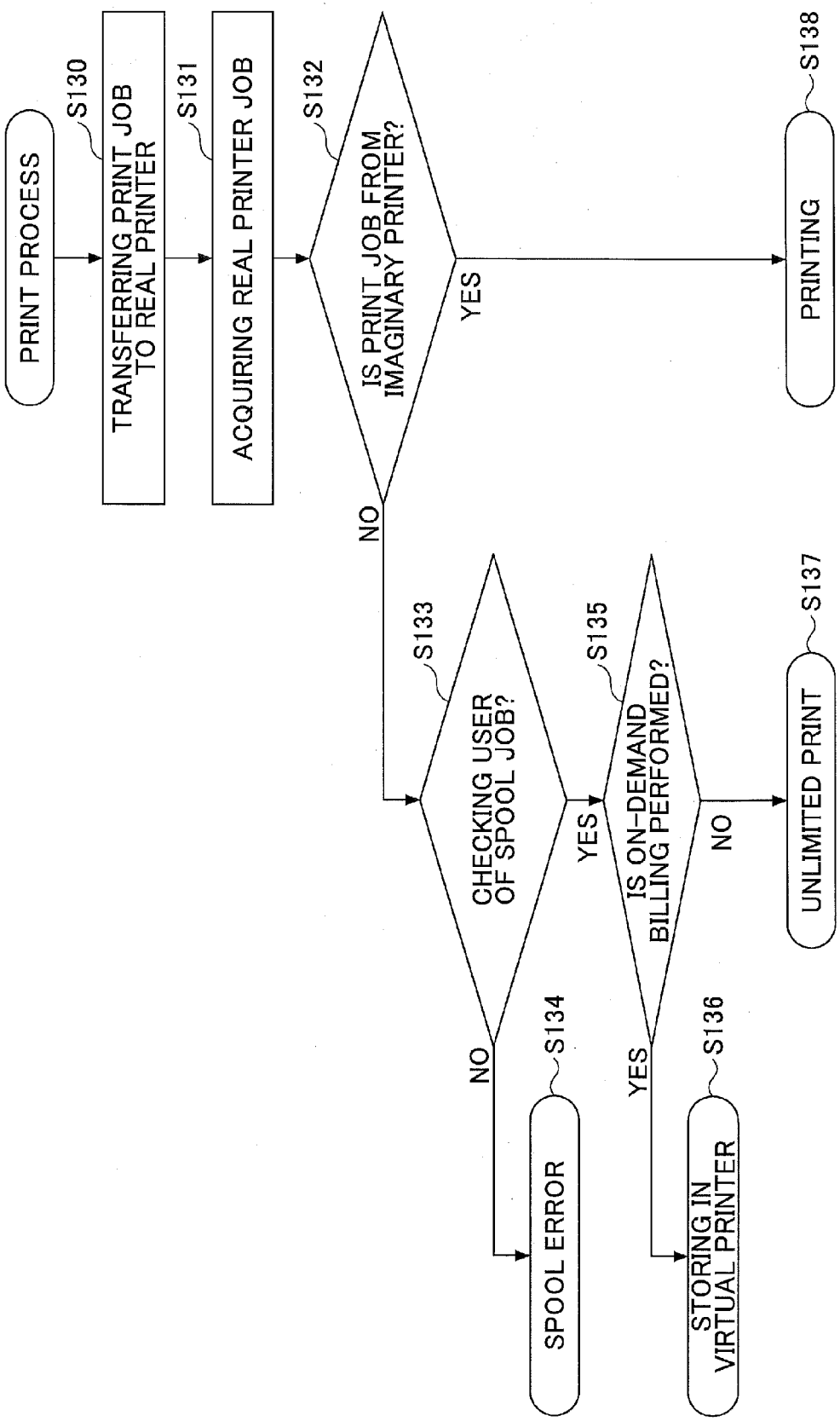
FIG. 19 is a flow chart illustrating an exemplary billing process in the print system of the embodiment.

In a case where the displayed charge is paid in YES of step S95, the print server apparatus 3 performs a print process illustrated in FIG. 19.

<<Print Process (Billing)>>

Figure 18:
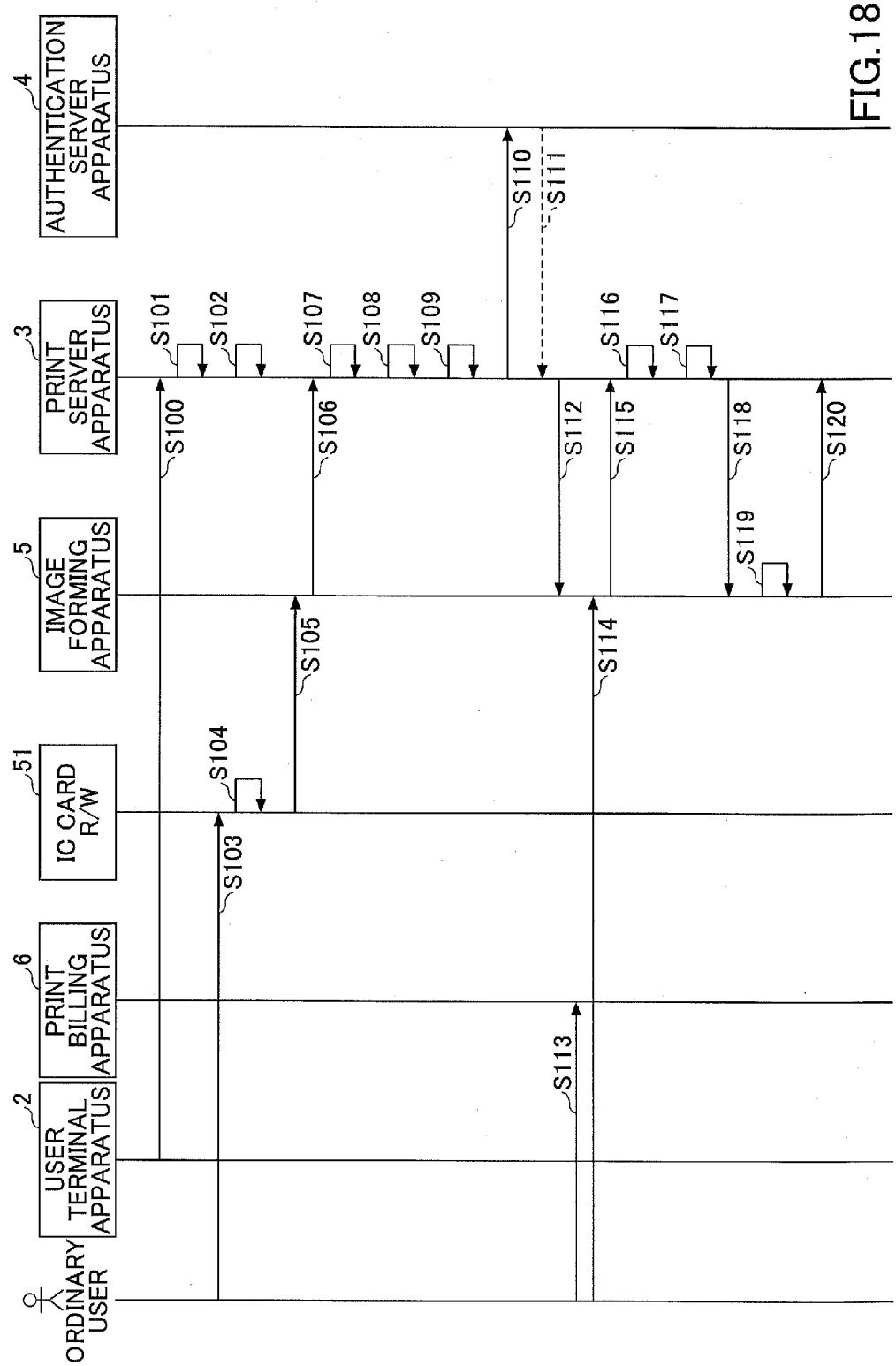
FIG. 18 is a sequence chart illustrating an exemplary billing process in the print system of the embodiment.

Next, described is the print process of the print system 1 in a case where the on-demand billing is set. FIG. 18 is an exemplary sequence chart of on-demand billing print that is performed by the ordinary user using the image forming apparatus 5.

The ordinary user operates to perform the print job by the user terminal apparatus 2 (step S100). Then, in the print server apparatus 3, the print job receiving unit 32 causes the print job to be spooled in the virtual printer 7 (step S101). Further, the print server apparatus 3 predicts the charge for the spooled print job (step S102). The charge for the spooled print job is predicted by correlating the user information added to the print job, the job information such as the number of sheets, the paper size, and the print type, and so on with a charge table, a user information table, or the like, which are held by the print server apparatus 3.

The ordinary user carries the own IC card for the authentication closer to the I/C card R/W 51 provided to the image forming apparatus 5 (step S103). Then, the IC card R/W 51 reads the card information (step S104) and sends the read card information to the communication unit 52 of the image forming apparatus 5 (step S105).

The communication unit 52 of the image forming apparatus 5 sends the received card information and an own apparatus identification code to the print server apparatus 3 (step S106).

The print server apparatus 3 checks whether the acquired apparatus identification code is registered in the apparatus identification code table 301 (step S107). The print server apparatus 3 checks whether the acquired card information is registered in the user table 308 of the IC card for the authentication (step S108). In step S108, the print server apparatus 3 determines that the IC card information corresponds to the IC card for the authentication by the card determination unit 33. Further, the print server apparatus 3 checks the print setup of the corresponding image forming apparatus 5 using the apparatus identification code as a key from the image forming apparatus setup table 302 (step S109). At this time, the print server apparatus 3 checks that the on-demand billing is performed.

After the checks in steps S107 to S109 are completed, the authentication request unit 34 of the print server apparatus 3 requests the authentication server apparatus 4 to authenticate based on the user name associated with the card information (step S110). If the authentication server apparatus 4 determines that the authentication is possible, the successful authentication is sent to the print server apparatus 3 (step S111).

After receiving the successful authentication, the print server apparatus 3 extracts the print job associated with the authenticated user from the job accumulation unit 39 (specifically, the virtual printer 7) and causes a view of the print jobs to be acquired and displayed by the job information acquisition unit 55 of the image forming apparatus 5 (step S112).

Then, the ordinary user pays the charge for the print job to be printed among the view of the displayed print jobs to the print billing apparatus 6 (step S113). Then, the ordinary user selects the print job to be printed from the view of the print jobs and performs a print request (step S114). Then, the job selection receiving unit 56 of the image forming apparatus 5 requests the selected print job to the print server apparatus 3 (step S115).

The print server apparatus 3 checks the amount of the charge paid by the ordinary use and the amount of the predicted charge in step S116, and transfers the requested print job from the virtual printer 7 to the real printer 50 associated with the image forming apparatus 5, to which the IC card is carried by the ordinary user closer (which is designated by the user) in step S117.

Thereafter, the print control unit 38 of the print server apparatus 3 sends an instruction of performing the print job requested by the user to the image forming apparatus 5 (step S118). The image forming apparatus 5 receiving the print instruction performs the above-described print job by a printable number of sheets (step S119). After the printing is completed, the image forming apparatus 5 sends a print log to the print server apparatus 3 and causes the print server apparatus 3 to accumulate the print log (step S120).

FIG. 19 is a flowchart illustrating an exemplary print process of the print system 1 in a case where the on-demand billing is set. The print process includes the on-demand billing and the direct print, both of which are described below. In a case of the on-demand billing, the user authentication and the billing are performed using the IC card for the authentication described in steps S92 to S95 of FIG. 17 as a preprocess of the print process. After step S95, various steps illustrated in FIG. 19 are processed.

When the print server apparatus 3 receives an instruction to print from the image forming apparatus 5 or the user terminal apparatus 2, the print server apparatus 3 transfers the print job from the virtual printer 7 to the real printer 50 (step S130). The print job is spooled to the virtual printer 7 in a case where the print setup is set to the on-demand billing. In this case, the print server apparatus 3 transfers the print job to the real printer 50 associated with the image forming apparatus 5, to which the IC card for the authentication is carried closer by the ordinary user. In a case where the print setup is set to the direct print, the print job is directly accumulated from the user terminal apparatus 2 to the real printer 50, which is associated with the image forming apparatus 5 designated by the ordinary user. Therefore, this step S130 is skipped.

When the real printer 50 acquires the print job (step S131), the print server apparatus 3 checks whether the acquired print job is from the virtual printer 7 (step S132). In this step S132, it is checked whether the print setup is the on-demand billing or the direct print. As described above, in a case where the print job is through the virtual printer 7, the print setup is the on-demand billing. On the other hand, in a case where the print job is not through the virtual printer 7, the print setup is the direct print.

In a case where the print job is not through the virtual printer 7 (the direct print) in NO of step S132, the print server apparatus 3 performs a user check of the spooled print job (step S133). Said differently, it is checked (authenticated) whether the user who instructs the direct print is a legitimate user with the user information added to the print job. If the user is not the legitimate user in NO of step S133, a spool error occurs (step S134). If the user is the legitimate user in YES of step S133, the print server apparatus 3 checks whether the print setup is set to the on-demand billing with the setup table 304 of, for example, the IC card for the setup change (step S135).

In a case where the print setup is set to the on-demand billing in YES of step S135, the print job is accumulated (spooled) to the virtual printer 7 (step S136). Then, a print instruction from the image forming apparatus 5 is awaited. If the print setup is set to the on-demand billing, the image forming apparatus 5 is caused to perform unlimited print. In the unlimited print, there is no limitation to the number of printed sheets (step S137).

In a case where the print job is received from the virtual printer in YES of step S132, the print server apparatus 3 causes the image forming apparatus 5 to print using the on-demand billing (step S138).

As described above, the print system 1 of the first embodiment is structured to change the print setup of the image forming apparatus 5 based on the print setup information associated with the card information of the IC card for the setup change when the IC card for the setup change used by the user having the setup authority is authenticated. Therefore, when the user having the setup authority such as the teacher in the university or the like wishes to change the print setup such as the unlimited print, the print without the billing or the direct print only during a lesson or a lecture, it is possible to quite easily change to a predetermined print setup by carrying the IC card for the setup change closer to the IC card for the setup change. Further, after changing the print setup of the image forming apparatus 5, it is possible to do a print administration such as the upper limit administration or the on-demand billing for the ordinary user who uses the IC card for the authentication.

[Second Embodiment]

A print system 10 of a second embodiment includes an environment of cloud computing. FIG. 20 illustrates a system structure of the print system 10 of the second embodiment. The print system 10 includes a network N2 of a private environment such as a university or an enterprise and a network N3 of a public environment providing a cloud computing service. The network N2 and the network N3 are connected by a firewall FW provided on a side of the network N2. The firewall FW is installed at a contact point between the network N2 and the network N3 and relays an access from the network N2 to the network N3.

In the network N3 providing the cloud computing service includes at least one information processing apparatus (a computer system) that provides a function by a web application or an application on a server side. This information processing apparatus substantializes a print server apparatus 3 (the print server apparatus 3 may include the virtual printer), the authentication server apparatus 4, or the like on the side of the network N3. The network N2 of the private environment such as a university or an enterprise includes the user terminal apparatus 2, the image forming apparatus 5, and the print billing apparatus 6.

The user terminal apparatus 2, the image forming apparatus 5, and the print billing apparatus 6 are similar to those described in the first embodiment. Further, the print setup change process is performed by the print server apparatus and the authentication server apparatus 4, which are provided on the side of the network N3. In the print process, the image forming apparatus 5 and the print billing apparatus 6 performs an authentication process using the print server apparatus 3 and the authentication server apparatus 4 on the side of the network N3, acquires the print job (print data and print data for distribution), and prints. A specific authentication process, a print setup change process, and a print process are as described in the first embodiment.

[Third Embodiment]

The procedure of the processes, the specific names, and information including various data and parameters explained in the above description and figures can be arbitrarily changed except for a case where a specific description is given. A specific mode of distribution or integration of the various apparatuses is not limited to the above described. A part or all of the various apparatuses can be functionally or physically distributed or integrated at an arbitrary unit depending on various loads, use conditions, or the like. For example, the print server apparatus 3 described in the above embodiments may be structured to be included in various systems depending on a usage or a purpose or to be performed as a print system by distributing or integrating parts of the print server apparatus 3.

<Program>

As one mode, various processing programs performed in the print system 1 may be provided by recording in a recording medium readable by a computer in a file having a installable format or an executable format. The recording medium is a CD-ROM, a flexible disk (FD), a CD-R, a DVD, or the like. On the other hand, the processing program may be stored in a computer connected to a network such as the Internet and may be downloaded through the network. Further, the various processing programs may be provided by previously installing on a ROM or the like.

The program is executed in the print system 1 when hardware, i.e., a CPU (a processor), reads and executes a control program from the recording medium and loads the program on a main memory device to generate the part.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

According to the embodiments of the present invention, there is provided the output system that enables an output setup of the image forming apparatus to be easily changed when the user having the setup authority uses the IC card.

Hereinafter, an output apparatus corresponds to the image forming apparatus 5. Further, at least one information processing apparatus corresponds to the user terminal apparatus 2, the print server apparatus 3, the authentication server apparatus 4, and/or the print billing apparatus 6. Furthermore, a portable recording medium corresponds to the IC card. A portable recording medium for setup corresponds to the IC card for the setup change.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the output system has been described in detail, it should be understood that various changes, substitutions, and alterations could be made thereto without departing from the spirit and scope of the invention.

This application is based upon and claims the benefit of priority of the prior Japanese Patent Application No. 2014-014097, filed on Jan. 29, 2014, the entire contents of which are incorporated herein by reference.

What is claimed is:

1. An output system including at least one output apparatus, an information processing apparatus, and a network connecting the at least one output apparatus with the information processing apparatus, the output system comprising:
    a reading unit that reads identification information stored in a portable recording medium;
    an output setup change unit that changes, when the portable recording medium is a portable recording medium for setup, an output setup of the output apparatus to another output setup associated with the identification information of the portable recording medium for setup; and a setup recovery unit that causes the output setup of the output apparatus changed by the output setup change unit to be returned to an initial setup.

2. The output system according to claim 1, the output system further comprising:

a memory unit that stores group information of the output apparatus, wherein the output setup change unit changes the output setup of the output apparatus associated with the reading unit and another output apparatus belonging to a same group of the output apparatus.

3. The output system according to claim 1, wherein when the reading unit reads the identification information of the portable recording medium for setup again, the changed output setup of the output apparatus is returned to the initial setup.

4. The output system according to claim 1, wherein when a predetermined time passes after the output setup change unit changes the output setup, the changed output setup of the output apparatus is returned to the initial setup.

5. An output method performed by an output system including at least one output apparatus, an information processing apparatus, and a network connecting the at least one output apparatus with the information processing apparatus, the output method comprising:

reading identification information stored in a portable recording medium;

changing, when the portable recording medium is a portable recording medium for setup, an output setup of the output apparatus to another output setup associated with the identification information of the portable recording medium for setup; and causing the output setup of the output apparatus changed by the changing to be returned to an initial setup.

6. The output method according to claim 5, the output method further comprising:

storing, by a memory unit, group information of the output apparatus, wherein the changing changes the output setup of the output apparatus associated with the reading unit and another output apparatus belonging to a same group of the output apparatus.

7. The output method according to claim 5, wherein when the reading reads the identification information of the portable recording medium for setup again, the changed output setup of the output apparatus is returned to the initial setup.

8. The output method according to claim 5, wherein when a predetermined time passes after the changing changes the output setup, the changed output setup of the output apparatus is returned to the initial setup.

9. An information processing apparatus connected to at least one output apparatus that is associated with a reading unit reading identification information stored in a portable recording medium through a network, the information processing apparatus comprising:

an output setup change unit that changes, when the portable recording medium is read by the reading unit, an output setup of the output apparatus to another output setup associated with the identification information of the portable recording medium for setup; and a setup recovery unit that causes the output setup of the output apparatus changed by the output setup change unit to be returned to an initial setup.

10. The information processing apparatus according to claim 9, the information processing apparatus further comprising:

a memory unit that stores group information of the output apparatus, wherein the output setup change unit changes the output setup of the output apparatus associated with the reading unit and another output apparatus belonging to a same group of the output apparatus.

11. The information processing apparatus according to claim 9, wherein when the reading unit reads the identification information of the portable recording medium for setup again, the changed output setup of the output apparatus is returned to the initial setup.

12. The information processing apparatus according to claim 9, wherein when a predetermined time passes after the output setup change unit changes the output setup, the changed output setup of the output apparatus is returned to the initial setup.

* * * * *